United States Patent [19]

Rossi

[11] Patent Number: 4,864,175

[45] Date of Patent: Sep. 5, 1989

[54] ROTOR FOR AN ELECTRIC MOTOR

[76] Inventor: Lothar Rossi, In den Steinen 12, D-7302 Ostfildern 2, Fed. Rep. of Germany

[21] Appl. No.: 182,475

[22] Filed: Apr. 15, 1988

[30] Foreign Application Priority Data

Apr. 23, 1987 [DE] Fed. Rep. of Germany ....... 3713610

[51] Int. Cl.$^4$ ............................................. H02K 21/12
[52] U.S. Cl. ..................... 310/156; 310/51; 310/91; 310/258
[58] Field of Search .................. 310/156, 268, 91, 51, 310/261, 46, 162, 157; 74/573 R

[56] References Cited

U.S. PATENT DOCUMENTS

| 3,828,212 | 8/1974 | Harkness | 310/156 |
| 4,536,672 | 8/1985 | Kanayama | 310/268 |
| 4,568,862 | 2/1986 | Tassinario | 310/268 |

FOREIGN PATENT DOCUMENTS

| 1325465 | 3/1963 | France | 310/268 |

Primary Examiner—R. Skudy
Attorney, Agent, or Firm—Darby & Darby

[57] ABSTRACT

In connection with a rotor for an electric motor, in particular a disk-type rotor comprising flat magnets being arranged in the form of angular segments and in spaced relationship and supported by supporting disks mounted on both sides of a central hub, it is proposed to provide the supporting disks with window-like openings corresponding to the contour of the said flat magnets so that the flat magnets are seated between the supporting disks without a cover in the axial direction and are secured by them against the effects of centrifugal forces in the sense of rotation and by an integrally formed outer marginal ring, the flat magnets being additionally guided and secured in the axial direction by inner projections formed integrally with the inner central annular disk area. The spoke-like webs which taper towards each other between the flat magnets form together with the outer integrally formed hoop-like ring a stiff triangular structure.

8 Claims, 2 Drawing Sheets

ROTOR FOR AN ELECTRIC MOTOR

BACKGROUND OF THE INVENTION

The present invention relates to a rotor for electric motors The electric motors to which this invention relates are of the type where the rotors comprise permanent magnets, i.e. which do no include a slipring and which —in a particular case which will be described hereafter although the invention is by no means restricted to it —are similar in function to a synchronous machine and may be described also as brushless D.C. motors.

It is usual in the case of such electric motors to equip the rotor with permanent magnets distributed over the periphery of the disk in angle segments. The magnets used may in this case consist of flat-type magnets which may have a thickness of only 3 mm, but in any case a thickness somewhere in this range. These magnets are then operatively connected, electromagnetically, with magnetic fields resulting from coils arranged in axial layers with the rotor and acting on the magnets, for example, from both sides. The respective segment-type magnets of the rotor exhibit axial magnetization, it being desirable to keep the air gap to the adjoining structures generating the migrating magnetic fields as small as possible in the axial direction in order to achieve optimum efficiency.

However, problems have been encountered in such electric motors in connection with the mounting of the magnets constituting the rotor, which must be as precise as possible, to provide the smallest possible air gap and must, of course, be resistant to aging.

Consequently, it has been known to embed the partial magnets, which extend over given angular segments of a disk which then constitutes the rotor, in a plastic material so that a disk-shaped or wheel-shaped rotor is obtained. This method is, however, connected with the disadvantage that the plastic material may age or get distorted and that, in addition, much of the useful air gap is lost due to the fact that the magnets are covered (on both sides) by the plastic material.

According to another known method, the magnets are mounted on a hub fixed to the rotor shaft by means of metal disks (stainless steel disks) arranged on both sides. To this end, the magnet segments are inserted between the two disks and fixed in place, usually by gluing, in which case the arrangement is to be secured, however, by a retaining sleeve or bandage which has to be applied from the outside for securing the magnet segments, which have been glued to the metal disks on both sides, against the effects of the very high centrifugal forces. Such a bandage may, for example, consist of a peripheral composite glass fiber structure.

The overall structure of such a rotor comprising stainless steel disks on both sides and a peripheral composite glass fiber bandage is quite complex and therefore produces disadvantages as regards its structure and production. In addition, however, much of the useful air gap is lost in the case of such a structure due to the required sheet thickness and, in certain cases, also as a result of the cover layer over the magnets. Finally, the adhesive, which primarily secures the magnet segments in the two disks, is subjected mainly to shearing stresses —a type of stress which even high-quality adhesives are not always capable of withstanding.

Now, it is the object of the present invention to provide a rotor for an electric motor, where individual magnets (magnet segments) are arranged in the form of given angular segments over the periphery of the rotor, which on the one hand requires only little mechanical input and can, therefore, be produced at low cost and in a simple manner. On the other hand, the rotor retains the magnets in every respect safely and undetachably against the action of external forces, in particular against the action of centrifugal forces, without the need to apply a covering on the axial surfaces of the magnet segments.

ADVANTAGES OF THE INVENTION

The rotor according to the invention achieves this object in an amazingly simple manner, with the aid of the characterizing features of the main claim although it would initially appear that due to their conflicting nature, the described requirements can be met only with an extremely high technical input, if at all.

The invention provides in this connection the additional decisive advantage that the mounting means consist of a single material, i.e. that no bandages or separate retaining rings are required; nevertheless, the magnet segments, with their free axial surfaces, are retained in their recesses with absolute security, and with the least possible air gap, against the effects of any type of axial, radial and rotary forces.

Another advantage of the invention is seen in the fact that the invention provides a particularly precise and invariable support for the magnet segments, and that this support is not influenced, as regards its shape or adjustment, by aging influences.

In fact, the same parts which locate the magnets on the hub in the axial direction also retain the outer periphery of the magnets on the flat magnet rotor against any type of centrifugal forces, without any additional means or remedies being required for this purpose.

The invention which basically provides a rigid triangular structure, has the respective magnet segments seated in pocket-shaped recesses, secures the rotor against any imbalances due to the regular distribution of its elements about the periphery of the rotor, is very simple from the mechanical point of view, but provides at the same time a mechanically rigid connection in every direction which means in particular that it is secure against bending or tilting.

It is a particular advantage of the present invention that when the adhesives are used for connecting the at least one supporting disk of special design with the hub seated on the rotor shaft and/or with the magnets, the adhesives are not subjected to shearing stresses. On the other hand, however, it is also possible to do without any gluing and to secure the disk/disks on the hub and relative to each other by other fixing means, for example by rivets.

BRIEF DESCRIPTION OF THE DRAWING

One embodiment of the invention will be described hereafter with reference to the drawing in which.

DESCRIPTION OF THE EMBODIMENTS

It is the basic idea of the present invention that each permanent magnet (flat-type magnet) completing the circular shape of the rotor is inserted flush, and retained in a window-like recess of at least one supporting disk which is firmly connected to a hub arranged on the rotor shaft, and that preferably two supporting disks are used which then retain the hub between them and secure in addition in the axial direction certain portions of the permanent magnets by overlapping small marginal portions thereof by appropriate extensions. The extensions further comprise spoke-like, integrally formed webs tapering towards each other between the permanent magnets and ending, at the points where they are in contact with each other, in an integrally formed outer ring which secures the permanent magnets against, and absorbs, the effects of centrifugal forces.

Accordingly, the supporting structure according to the invention for a plurality of permanent magnets distributed over the circumference of the flat-magnet rotor consists only of at least one, preferably two supporting disks receiving the flat magnets in window-like recesses, without the latter being covered in the axial direction, and supporting and retaining them invariably against all axial, radial and rotary forces, without any other auxiliary means or remedies.

Figure 2:
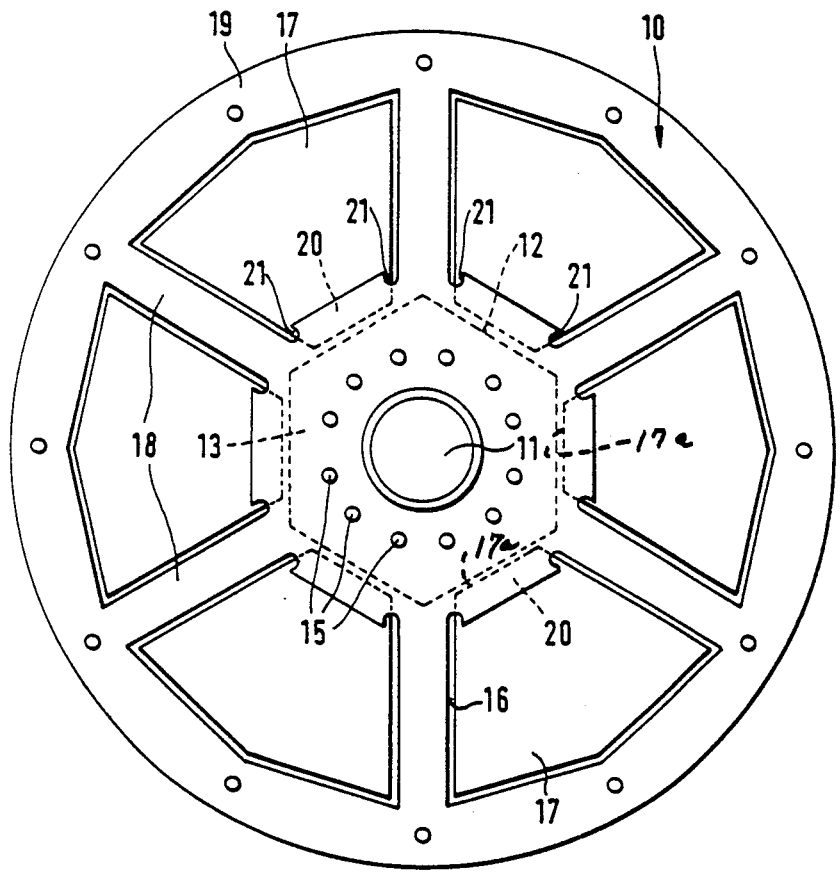
FIG. 2 shows a top view of one embodiment of the rotor comprising a hub and permanent magnets mounted in window-like recesses of at least one rotor disk plate.

FIG. 2 showing a top view of the rotor, only one of the supporting disks can be seen which is generally described by reference numeral 10. A central shaft 11 carries a hub 12 —the particular embodiment one of hexagonal shape —which is not visible in the representation of FIG. 2, which therefore is indicated by broken lines and which may be mounted on the shaft 11 either by a press fit or in any other suitable manner.

Figure 3:
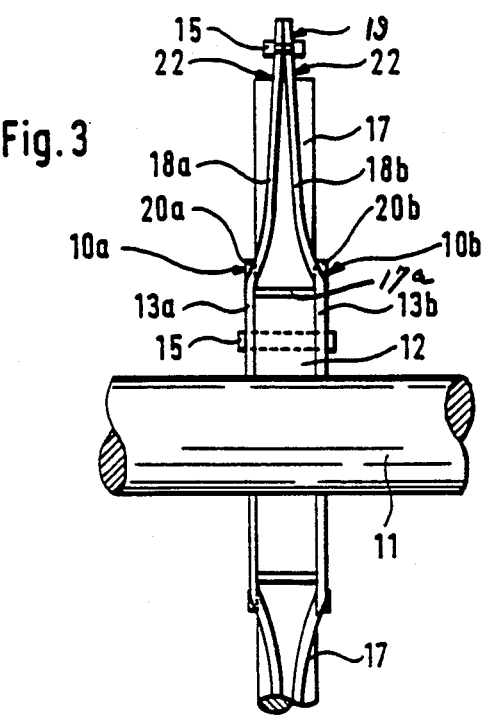
FIG. 3 shows a side view of the embodiment according to FIG. 2, illustrating the way in which the magnets are seated on the hub and also the connection and arrangement of the supporting disks.

As can be seen best in FIG. 3, the hub 12 is embraced on both sides by inner central annular disk areas 13a, 13b of the supporting disks 10a, 10b, provided on both sides whereby the supporting disks 10a, 10b are supported on the hub 12. The connection between the inner annular disk areas 13a, 13b and the adjacent hub surfaces may be implemented either by gluing, or by any other means, for example by rivets 15.

According to a simple embodiment of the invention, which still implements the basic idea of the invention, only one supporting disk is provided which is then seated on the hub or mounted thereto in a central position and exhibits window-like openings matching the contour of the flat magnets and receiving the latter. This arrangement also ensures that the permanent magnets are securely retained in the radial direction and against rotary forces, while additional security against axial forces can be achieved by gluing.

The preferred embodiment illustrated by the figures of the drawing uses, however, two supporting disks 10a, 10b each comprising window-like openings 16 of a shape enabling the respective flat-type permanent magnets to be inserted in flush relationship. In FIG. 2, the flat-type magnets are designated by reference numeral 17. While the shape and type of the window-like openings 16 and, accordingly, the outer contour of the flat-type magnets 17 inserted therein may, generally, be selected as desired, the basic structure of each supporting disk 10 —in the case of the double-disk design of the flat-magnet rotor illustrated in FIG. 3, of the disks 10a and 10b—is such as illustrated by the top view of FIG. 2. Accordingly, the supporting disk 10 comprises an inner central annular disk area 13 with webs 18 projecting therefrom like spokes of a wheel, the webs being interconnected at their outer periphery by a (hoop-like) ring 19 likewise formed integrally with the webs 18.

Accordingly, each supporting disk exhibits a generally wheel-like shape.

According to an advantageous improvement of the supporting disks, additional axial retaining webs or projections 20 extending radially beyond the outer periphery of the hub 12 may be formed integrally with the inner central annular disk area 13, adjacent the latter and between pairs of the said spoke-like webs. Each of the said webs 20 may be separated from their adjoining spoke-like webs 18 by short cuts or recesses 21 of a desired depth provided on both sides.

The flat magnets 17 are then arranged and mounted in the overall structure comprising the two supporting disks 10a, 10b, in a particular manner which will now be described with reference to the representation of FIG. 3.

The flat magnets 17 rest on the adjacent surface of the hub 12 by their lower surface or edge 17a. The hub may of course also exhibit a circular outer shape in which case the lower surfaces 17a of the flat magnets 17 exhibit the shape of a concave sector of a circle.

As one supporting disk 10a, 10b receiving the flat magnets 17 in their respective window-like openings 16 is mounted on each side of the hub 12, it can be seen that a lower portion of each of the flat magnets 17 is axially embraced by the two retaining webs 20a, 20b of each supporting disk 10a, 10b which project a little radially beyond the outer periphery of the hub 12, whereby these portions are positioned and retained securely against axial movements, as in a pocket. The two projections or retaining webs 20a, 20b, therefore, serve as an axial guide for each flat magnet 17, it being another particularity of this arrangement that the spoke-like webs 18 which are arranged between the flat magnets 17 and which in FIG. 3 are designated by reference numerals 18a, 18b, approach each other in the axial direction, which is rendered possible in this area due to the fact that the permanent magnets 17 are received in the window-like openings so that they cannot prevent the spoke-like webs 18a, 18b from approaching and, therefore, tapering towards each other, as shown very clearly in FIG. 3. It therefore results that the spoke like webs 18a, 18b of each of the oppositely arranged supporting disks 10a, 10b are dished inwardly, approach each other and finally form at their outer periphery a ring 19 which is formed integrally with each of the spoke-like webs 18.

Due to the fact that each pair of oppositely arranged spoke-like webs 18a, 18b is joined in this manner between each of the flat magnets 17, it is ensured that the adjoining edges of the flat magnets 17 and of the spoke-like webs 18 abut each other in flush relationship at this point, practically.,from the inner central annular disk area to the outer ring 19, so that it can be easily seen that each flat magnet 17 is safely held and invariably trapped on all sides by the three-dimensional supporting disk structure consisting of two oppositely arranged supporting disks 10a, 10b.

From the functional point of view, each of the supporting disks 10a, 10b therefore starts out from the plane of the axially spaced hub surfaces in which it is connected to the hub. This is also the plane in which the flat magnets 17 are axially centered by the retaining projections 20a, 20b. The disk structures, assuming thereafter the form of the spokelike webs, then leave this plane, tapering inwardly towards each other until they are united at ring 19, by which any centrifugal forces are safely absorbed, and the spoke-like webs finally also secure the permanent magnets in the sense of rotation, being actually located between the flat magnets 17, viewed in that direction. From the above it results that the supporting disks exhibit a tapering shape between the magnets, it being absolutely possible to interconnect the adjoining surfaces of the two supporting disks 10a, 10b in the upper contact area of the ring 19 by gluing or, as indicated by reference numeral 15, by means of rivets. Gluing may prove advantageous in the area indicated by reference numeral 22 in FIG. 3, i.e. in the area where the outer marginal edges of the flat magnets abut against the inner surface of the ring 19. Although no notable axial forces are exerted upon the permanent magnets in this area, a glued connection may serve to secure the final location and may, if desired, also be provided in all other contact areas between the flat magnets 17 and the supporting disks, i.e. between the spoke-like webs 18a, 18b and also in the area where the disks are supported on the hub.

One recognizes clearly the absolutely invariable and secure, but above all particularly stiff supporting structure for the permanent magnets 17 — particularly stiff because the arrangement provides a triangular structure formed by the circular disks which are initially spaced from each other in the inner central annular disk area and which then taper towards each other on their way to the ring 19, the stiff triangular shape which secures the rotor structure safely against tilting or bending being formed by their connection to the hub and/or, their interconnection in the form of the ring 19.

The hub may be mounted on the motor shaft by a press fit or a shrink fit. The transverse rivets at 15 may also be dispensed with, if it is preferred to use only an adhesive, preferably a suitable epoxy-type adhesive.

Figure 1:
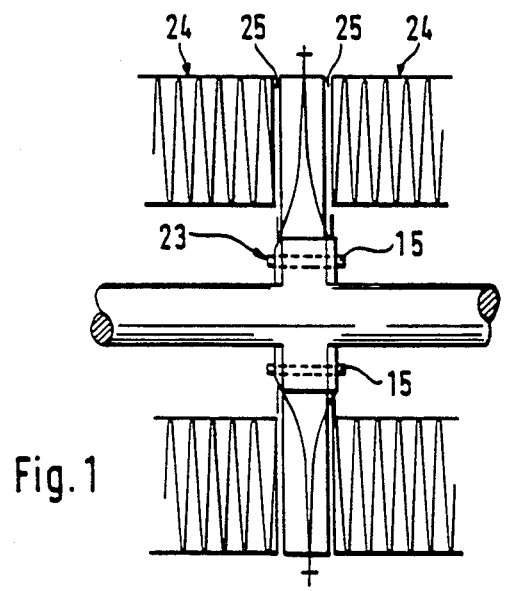
FIG. 1 shows a diagrammatic, partial side view of one embodiment of the rotor for an electric motor forming the subject of the invention, with coil structures adjoining both sides of the magnets of the rotor for generating the alternating magnetic field required for providing the rotary movement of the motor.

The representation of FIG. 1 illustrates part of the total structure. Adjoining the rotor 23, which exhibits the described arrangement, one can see the alternating magnetic fields for the coil structures 24 generating the movement of the rotor, the air gap 25 between the respective yokes being not covered, and accordingly not unnecessarily enlarged, by any retaining structures required for supporting the permanent magnets.

Finally, another advantageous embodiment of the invention is obtained when the transverse rivets, i.e. the rivets 15, used at the ring 19 and/or for mounting the hub are either simultaneously used for mounting balancing weights, or else designed to serve this function themselves, i.e. by having different weights and by being provided in non-uniform distribution over the periphery, according to the balancing requirements of the particular case.

All features mentioned or shown in the above description, the following claims and the drawing may be essential to the invention either alone or in any combination thereof.

I claim:

1. A rotor for an electric motor comprising a plurality of spaced flat magnets, each one being in the form of an angular segment; a hub; a supporting disk mounted on each side of said hub; openings in said disks in the shape of said magnets each receiving a respective one of said plurality of magnets therein; each of said disks having a central area positioned adjacent to said hub and a plurality of webs extending radially outwardly from said central area, and being located between adjacent magnets; the webs of said disks tapering toward each other in the radial direction to overlie the side edges of the adjacent magnets; the webs of each disk terminating in a respective ring which overlies the outermost edge of said plurality of magnets and which is connected to the ring of the other disk, whereby said magnets are secured against centrifugal and other forces.

2. Rotor according to claim 1, characterized in that the central area of each of the said supporting disks (10a, 10b) is connected with the said hub (12) by rivets (15).

3. Rotor according to claim 1, characterized in that said rings are connected by rivets.

4. Rotor according to claim 3, characterized in that said rivets (15) connecting said rings exhibit different weights.

5. Rotor according to claim 3, wherein said rivets are provided in non-uniform distribution about said rings to balance said rotor.

6. Rotor according to claim 1, characterized in that all connection points between the said supporting disks (10a, 10b) are connected by gluing.

7. Rotor according to claim 1, characterized in that radial projections extend from said central disk area, the said projections being sized to overlie said magnets to serve as axial guide for the flat magnets (17), on both sides thereof.

8. Rotor according to claim 1, characterized in that the said flat magnets (17) are fixed by gluing in the openings formed by the said supporting disks (10a, 10b).

* * * * *